United States Patent

[11] 3,552,642

[72] Inventor Hermann Flessner
262, Markstrasse, Bochum-Querenburg, Germany

[21] Appl. No. 775,744
[22] Filed Nov. 14, 1968
[45] Patented Jan. 5, 1971
[32] Priority Nov. 29, 1967
[33] Germany
[31] No. 1,549,730

[54] DEVICE FOR PUNCHING RECORDING MEDIA
12 Claims, 5 Drawing Figs.

[52] U.S. Cl. .......... 234/100, 234/128
[51] Int. Cl. .......... G06k 1/10
[50] Field of Search .......... 234/99, 100, 125

[56] References Cited
UNITED STATES PATENTS

| | | | |
|---|---|---|---|
| 3,232,526 | 2/1966 | Gerard .......... | 234/100 |
| 3,278,117 | 10/1966 | Post et al. .......... | 234/100 |
| 3,331,483 | 7/1967 | Hohmann .......... | 234/100X |

*Primary Examiner*—William S. Lawson
*Attorney*—Hane and Baxley

ABSTRACT: A recording tape punch comprises a housing incorporating a rotatable die wheel and a row of punches selectively operable by engagement with the die wheel periphery when the die wheel is displaced. The die wheel periphery is provided with apertures or dogs arranged in lines transversely of the wheel, the apertures or dogs in each line being arranged in the form of a code which is identified by an indicator wheel rotatable with the die wheel so that the punches in the row which are operated when any individual line is in register with the punches pierce the tape in accordance with a code shown by the indicator wheel. The die wheel is displaced by an operating handle which serves to advance a tape feed during its return movement.

Inventor:

HERMANN FLESSNER

BY Hane and Baxley

ATTORNEYS

Inventor:
HERMANN FLESSNER
BY Hane and Baxley
ATTORNEYS

PATENTED JAN 5 1971 3,552,642

Inventor:
HERMANN FLESSNER
BY Hane and Baxley
ATTORNEYS

PATENTED JAN 5 1971

3,552,642

Inventor:

HERMANN FLESSNER

BY Hane and Baxley

ATTORNEYS

Inventor:

HERMANN FLESSNER

BY Hane and Baxley

ATTORNEYS

DEVICE FOR PUNCHING RECORDING MEDIA

Punched tapes have long been used to carry input data for data processing equipment and as media for control operations in digital numerically controlled processes for five-track, six-track, seven-track and eight-track codes, as well as some special codes (Olivetti). The punching of the hole combinations, which represent the actual data or control information, has generally been effected hitherto by teleprinter, manual perforator, automatic accounting machines, for example, which are provided with a separate, electrically controlled punching mechanism. In addition, punched tapes are punched by separate output equipment of computers.

In the event of an erroneous perforation as a result of a fault in the equipment or a mistake by the producer of such a tape on one of said devices, fresh production of the tape by duplicating with appropriate corrections has hitherto been necessary. With short punched tapes this is reasonable; but with long punched tapes, such a correction operation involves additional expenditure of time and material while a satisfactory correction without the introduction of fresh errors can only be achieved with difficulty, particularly in the event of a defect in the punching equipment. With the equipment hitherto usual, insertion of the faulty punched tape in the punching equipment for the repunching of individual holes was impossible with the necessary accuracy.

Accordingly, with relatively long punched tapes, a remedy has hitherto been found in repunching individual holes by means of a simple punching plate in which the punched tape was inserted at the group of holes to be corrected. The group of holes could only be completed, however, by means of a simple punch. If too many holes were erroneously punched, then the group of holes or even entire parts of the punched tape were cut out and appropriately corrected lengths of tape spliced in between. Great care must be taken with this because not all reading equipment, particularly those which work photoelectrically or the like, permit a thickened portion at the splice. When too many holes are punched, the corresponding regions of the punched tape may also be covered entirely with thin adhesive tape which does not transmit light (for example colored Tesafilm)—transparent adhesive tape is sufficient if dielectric readers are used—and be completed again by means of said manual equipment, that is to say repunched at the correct positions only. In this case, it is necessary to know the hole combinations associated with the alphanumeric characters or to obtain them from an appropriate "key," an operation which is tedious and time wasting, particularly with very faulty tapes.

It is the object of the invention to provide a device which is simple in construction and which permits the punching of recording media, for example punched tapes, by hand.

In order to solve this problem, the invention provides that, mounted on a device body is an operating handle which acts on a die wheel mounted for rotation on the body and on which there are provided pressure areas corresponding to the selected perforation code, that associated with these pressure areas is a set of punches which are disposed below a guide path for the recording medium and cooperate with a punch die disposed above the guide path for the recording medium.

This device may be constructed in the form of a pair of pliers or as a desk apparatus.

The device according to the invention renders a relatively simple perforation or correction operation possible in that the punched tape is introduced at the point to be amended, and after the required letter, character or digit has been set, the whole combination is repunched. In this case, in the first instance only missing holes are produced afresh and those already existing simply traversed again. Since such a procedure can be carried out very rapidly, the correction of a plurality of hole combinations situated directly one behind the other can, in particular, be carried out very simply. If too many holes have been punched in the tape to be amended, then the entire region of the tape can be closed with the thin adhesive tape already mentioned—as indicated above—and very quickly repunched. Since, fundamentally, feed holes are also punched by the device according to the invention, the production of new punched tapes is also possible with tolerable expense if the tapes are not too long and therefore better produced on electronically or electrically controlled punch equipment, e.g. teleprinters. A particular advantage of the device according to the invention is simplicity with respect to production and handling. Only a few individual parts are necessary, only a few of which have to be machined with high precision and some of which are obtainable commercially.

A preferred embodiment of the invention is explained in more detail below with reference to the accompanying drawings in which.

Figure 1:
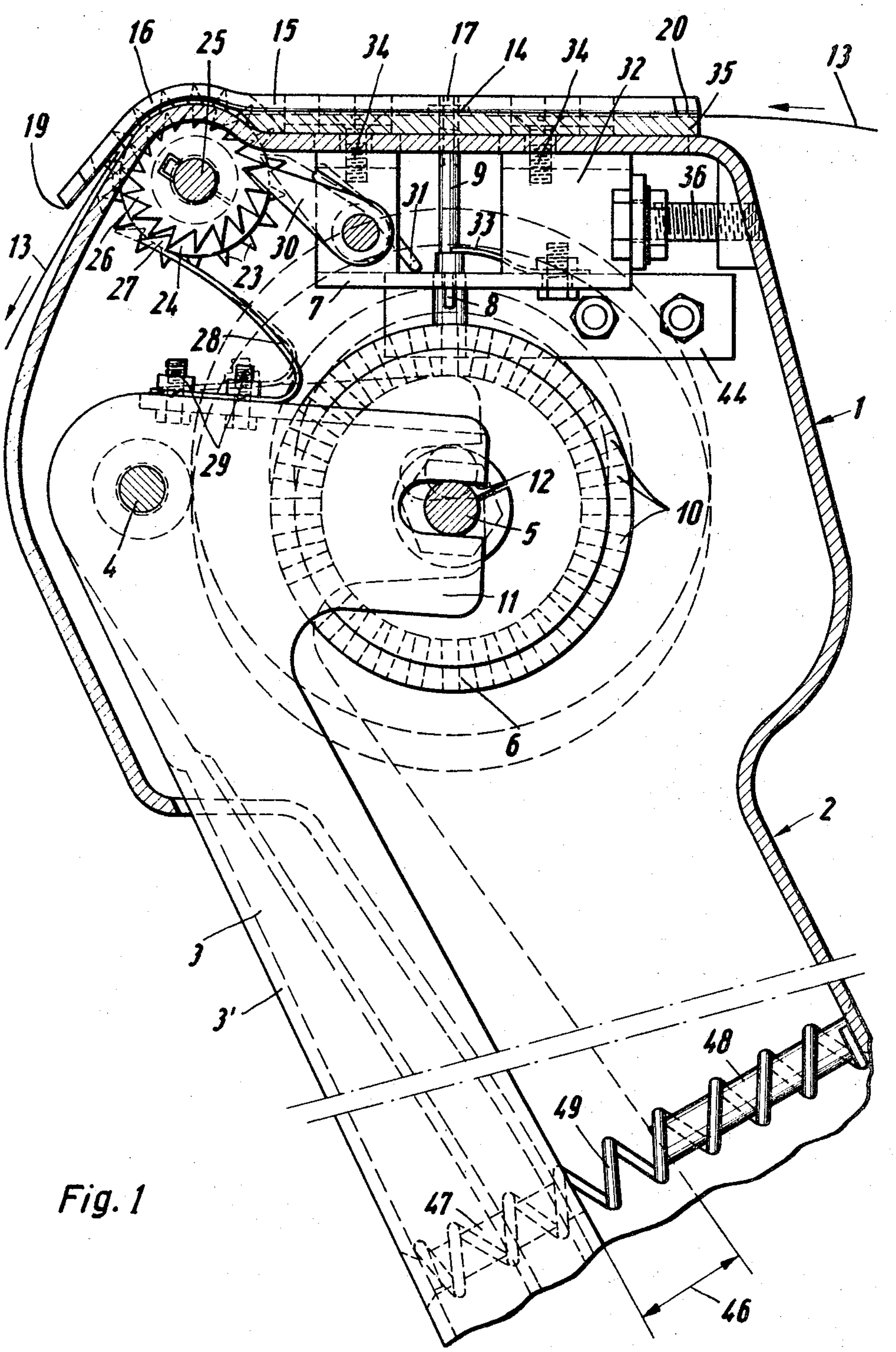
FIG. 1 shows a longitudinal section of a device according to the invention close behind a housing wall.
Figure 2:
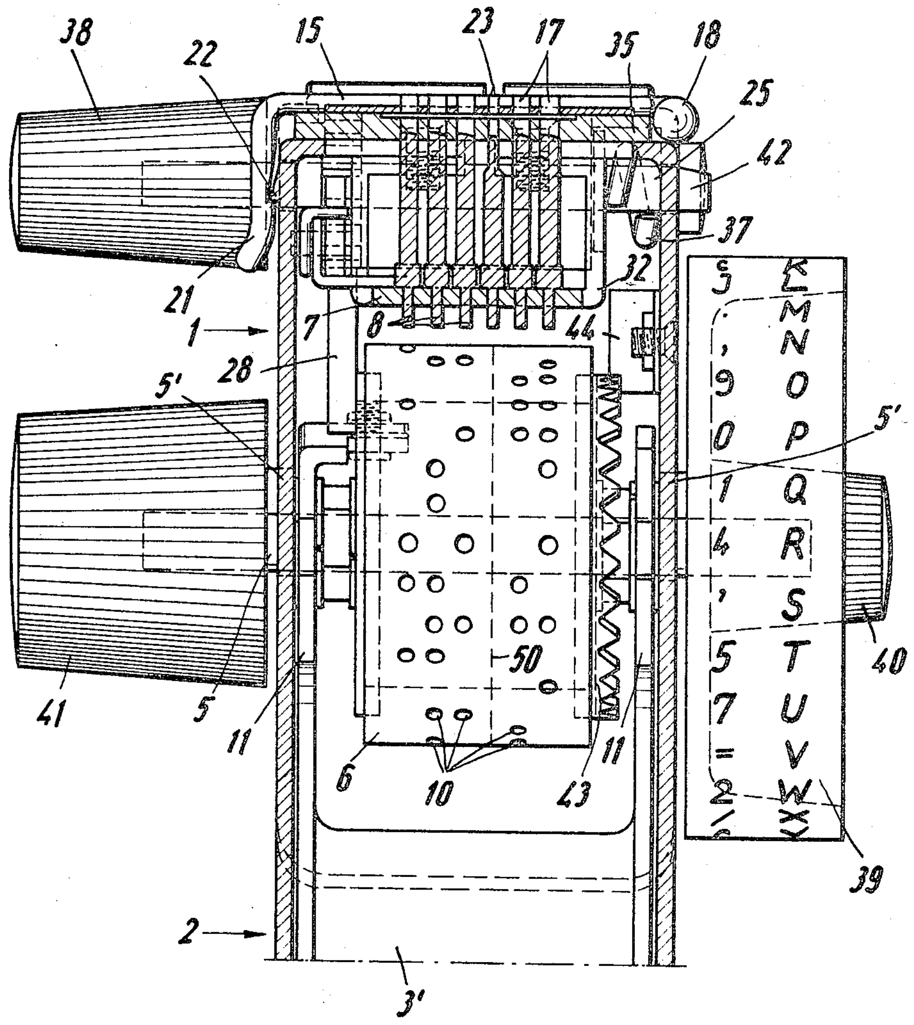
FIG. 2 shows a vertical cross section through the device.

The device consists of a housing body 1 (FIGS. 1 and 5) which merges into a handle 2 at the lower end and in the interior of which the essential parts of the mechanism are contained. An actuating lever 3 is mounted in the housing 1 for pivoting about a pin 4. When pressed against the handle 2, it causes a displacement of the shaft 5 of a die wheel 6 serving as a counterdie, with the latter in a preset position, against a plate 7 out of which there project the lower ends 8 of punches 9. The shaft 5 of the die wheel is guided in slots 5: in the housing walls (FIG. 2). The operating handle 3 is constructed in the form of a bellcrank lever. As a whole, it is U-shaped with a working surface 3: extending parallel to the handle 2 and inwardly projecting profile arms.

These profile arms are mounted on the shaft 4 adjacent to the housing walls and form, in one piece, an inwardly projecting arm 11 of the bellcrank lever. Each of these two arms 11 contains a slot guide 12 which engages on the shaft 5 of the die wheel.

Thus when the handle is pivoted, the shaft 5, and with it the die wheel 6, is displaced in the slots 5: in the housing 1.

If there is a hole 10 under a punch 9 on the die wheel constructed as illustrated here by way of example, then the punch 9 is not urged upwards. If there is no such hole, the punch is displaced upwards with accurate guiding and penetrates through an inserted punched tape 13 in cooperation with a matrix 14, which is mounted above the punched tape. This matrix contains accurately drilled holes of the required dimensions and is formed in a cover plate or, as illustrated, is accurately fitted, as regards dimensions, in a transparent plastics plate constructed in the form of a cover 15. This plastics plate likewise contains holes 17 corresponding with the matrix holes. It is secured by means of hinges 18, to one side of the housing 1 or of the cover plate provided with the guide path 35, and enables all the groups of holes in the inserted punched tape to be observed.

The cover 15 further comprises a slot 16 for the passage of the feed pins 23 of a feed wheel 24. It is further provided with a flange 21 which engages in a detent 22 on the housing 1 and holds the cover in its closed position.

The feed wheel 24 is mounted on a shaft 25 as close as possible to the punches 9. This feed wheel has a base member in the form of a roll which is at least as wide as the recording medium to be processed.

The cylindrical surface of the roll is provided with spikes 23, the spacing of which corresponds to the spacing of the feed holes in the recording medium.

Rigidly connected to the feed wheel 24 is a rachet wheel 26 which cooperates with a pawl 27. The pawl 27 is rigidly connected to a spring 28 which is secured to the operating handle 3 by means of screws 29. A locking pawl 30, which is initially tensioned by means of a spring 31, is provided for the locking.

Figure 3:
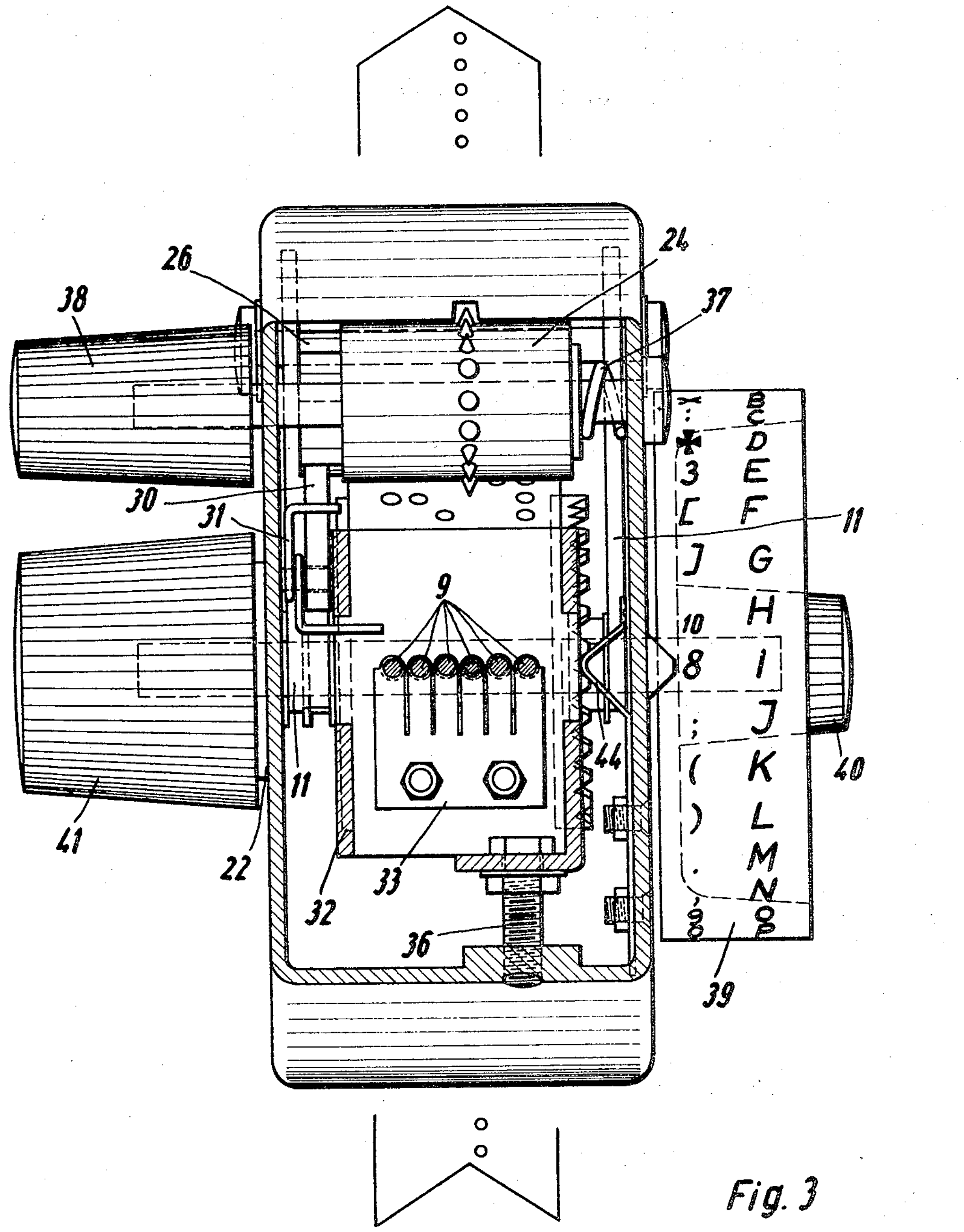
FIG. 3 shows a plan view of the device, a cover and a guide path being removed and the housing below being in horizontal section.

The bearing plate 7 for the punches 9 is part of a bearing bracket 32 which is generally U-shaped The bearing bracket carries a comb-shaped spring 33 (FIG. 3), the individual teeth of which act on the punches 9 and hold these in their position of rest.

The bearing bracket 32 is rigidly connected, by means of screws 34, to the guide path 35 for the recording medium, which forms a cover plate for the open head portion of the housing 1.

The screws 34 engage through slots in the head portion of the housing 1 so that the position of the bearing bracket in relation to the feed wheel can be varied to a small extent.

A set screw 36 acting on the bearing bracket 32 on the one hand and the housing 1 on the other hand serves to adjust and secure the set relative position.

Free rotation of the feed wheel is prevented by means of a friction spring 37 on the shaft 25. The shaft 25 of the feed wheel also carries. at one side of the housing 1, a rotary knob 38 which is rigidly connected thereto.

The shaft 5, which carries the die wheel 6, is rigidly connected, at one side of the housing, to an indicator wheel 39 and an associated rotary knob 40. At the other side of the housing, it is rigidly connected to a rotary knob 41.

The indicator wheel 39 is preferably interchangeably mounted on the shaft 5 and carries, at its circumference, the characters or letters associated with the code determining the arrangement of the holes 10 of the die wheel. A representation of the set code combination may additionally be associated in a visible manner with each character.

The setting is effected in relation to a pointer 42 secured to the housing 1.

In order to enable the particular setting of the die wheel to be fixed, the wheel is rigidly connected to a toothed rim 43 in the gaps between the teeth on which, there engages a spring 44 secured to the housing.

Figure 4:
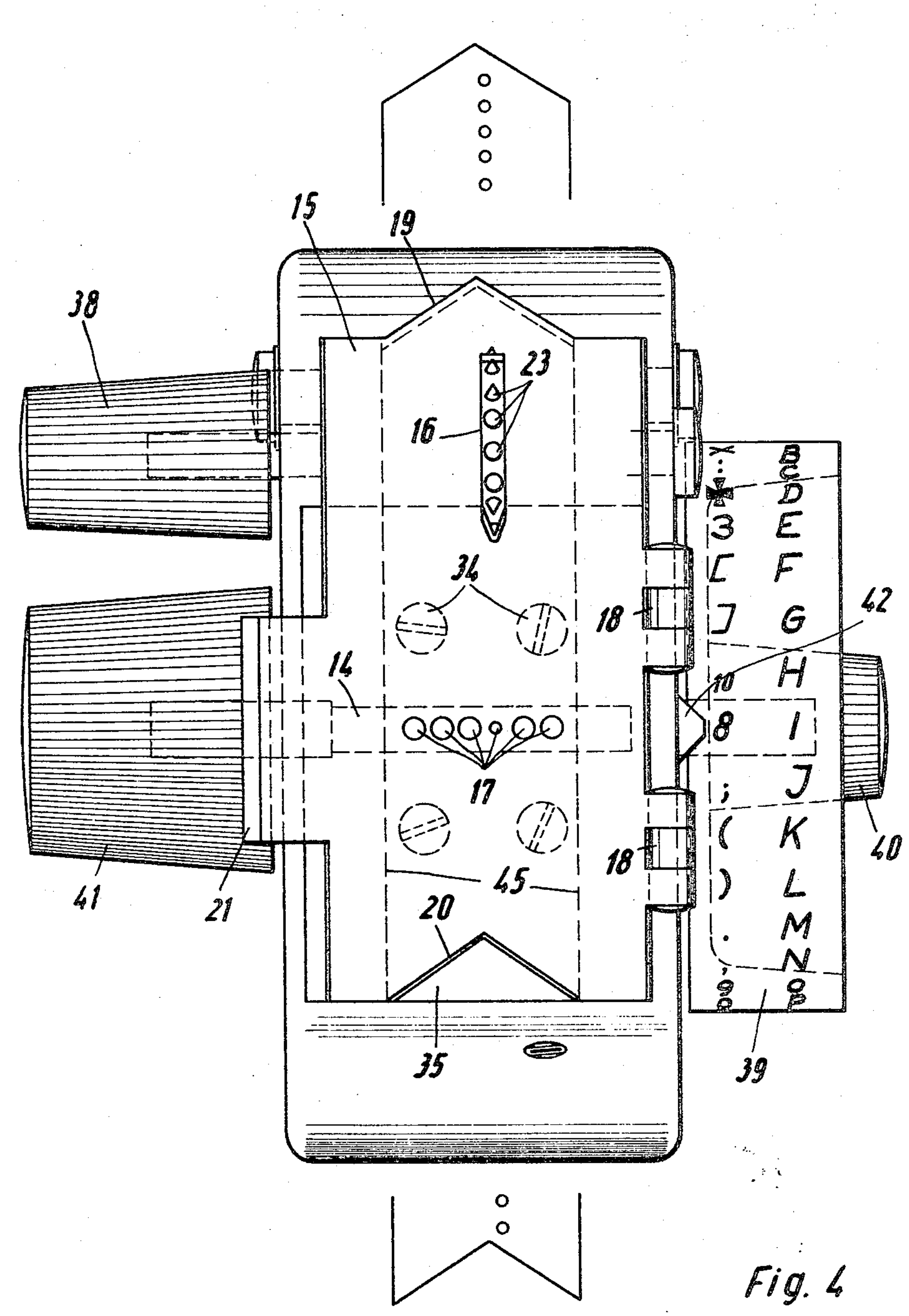
FIG. 4 shows a plan view of the head portion.

The guide path 35 comprises lateral guide surfaces 45 (FIG. 4) for the recording medium. The cover 15 is provided, at its two end faces, with tearing edges 19 and 20 respectively for the recording medium. In addition, it is arched in the region of the feed wheel 24 in such a manner that the feed holes in the recording medium can engage in the spikes of the feed wheel over as great a distance as possible.

When the operating handle 3 is actuated, the die wheel is urged against the lower ends 8 of the punches 9.

In order that the guide plate 7 of the bearing bracket 32 may not have to take up any contact pressure, provision is made for deflection of the operating handle to be possible only through a specific angular range 46.

For this purpose, a stop pin 47, which is in line with a stop pin 48 on the handle 2, is provided on the operating handle 3. A helical spring 49, which urges the operating handle 3 away from the handle 2 in the position of rest, is mounted over these stop pins 47 and 48. On actuation of the operating handle, the spring 28 and hence a dog 27 serving as a pawl are displaced.

In the course of this, the dog is pushed forwards out of its position between two teeth of a rachet wheel. When manual pressure is relaxed, the spring 48 mounted in the lower region between the actuating lever and the handle urges these two members apart again. In the course of this, the die wheel and the punches displaced upwards when the handle is actuated are lowered, being urged downwards back into their initial position by means of the spring 33. As during the downward movement of the die wheel, the cutting edges of the punches come below the plane of the inserted punched tape, the dog 27 on the steel spring 28 engaged in a tooth in the rachet wheel connected to the feed roll 24 turns the roll on through a distance which corresponds to the spacing between two groups of holes on the punched tape. In the course of this, the spikes 23 on the feed roll, in engagement in a plurality of feed holes convey the punched tape into the next hole position.

As soon as the actuating lever has returned entirely to the initial position as far as the stop, the locking pawl 30 jumps on by one tooth of the rachet wheel and holds the feed roll firmly in its new position. Thus every time the actuating lever is pressed and released, a hole combination corresponding to the setting of the indicator wheel is punched and the punched tape is advanced by one hole position.

The rotary knob 38 on the shaft 25 of the feed roll 24 permits turning on of the punched tape through any desired number of positions, the dog spring and the locking pawl engaging for each hole combination.

In a modification of the construction described so far, the die wheel 6 may be provided with dogs instead of with holes 10, which dogs must then always project at the points at which the punches have to be urged upwards.

In this modified form of construction, corresponding dogs are provided in each hole position along the line 50 in FIG. 2 which corresponds to the pressure surface for the feed perforations.

The indicator wheel may also be constructed in the form of a disc the pivot of which is mounted at an angle to the axis of the die wheel and is connected to the die wheel through a toothed rim and gear wheel.

With a modification of the gear ratio, this form of construction enables two or more revolutions of the roll to correspond to one revolution of the indicator wheel; digits and characters may then be disposed one behind the other, following on the letters, on the same circle as the indicator disc.

The indicator disc may also be integral with the die wheel. When an indicator disc is used, the separate die wheel may also be dispensed with if the indicator disc is so arranged and constructed that the counterdies, that is to say either dogs or holes, are disposed radially on this disc and can be brought precisely below the punches while the associated alphanumeric characters can be read off the same disc. On actuation, the disc would then be urged with its face against the lower ends of the punches. With this form of construction, the housing may be made simpler and kept smaller.

In the example illustrated, a die wheel is shown which is adapted for the punching of punched tapes in five-track code. The device may, of course, also be constructed appropriately for other codes. In particular, it is conceivable for the die wheel to be mounted in the device so as to be interchangeable for another, for example for a six-track or seven-track code.

The device as a whole may be produced from a metal or plastics material by the injection-moulding or compression-moulding process.

Figure 5:
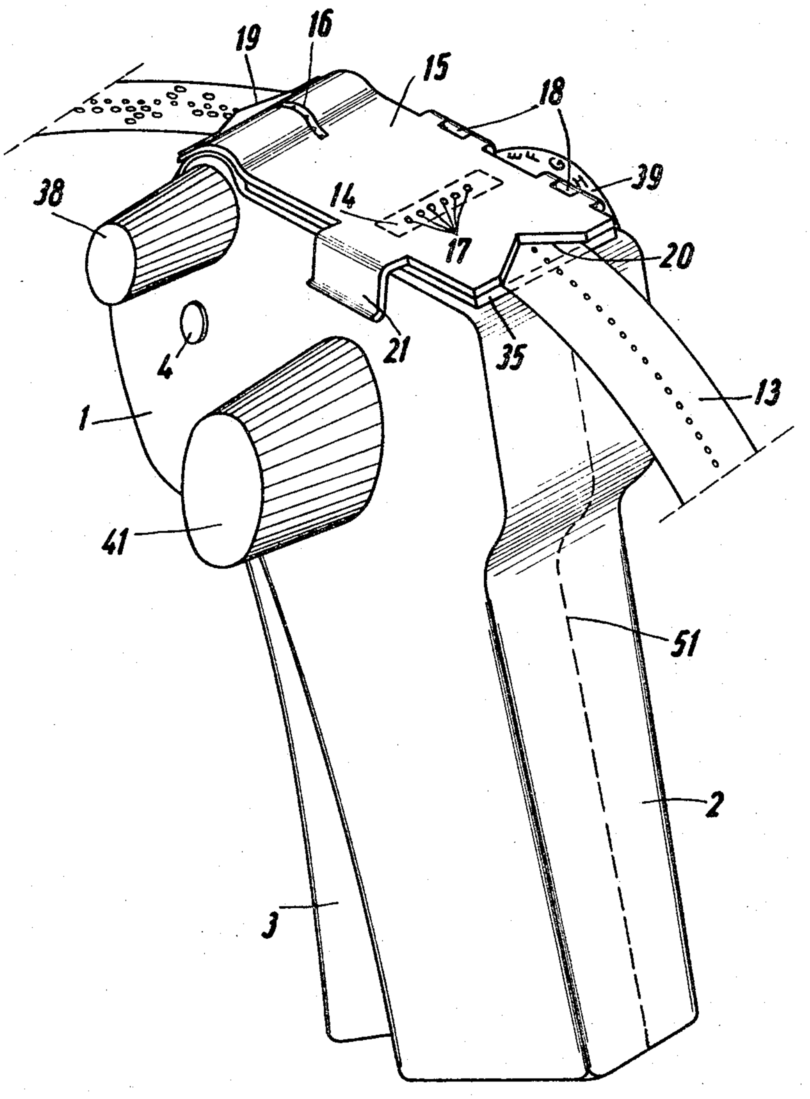
FIG. 5 is a perspective illustration of the device according to the invention.

In order to simplify the moulds it is advisable to produce the housing of the device in two shells in mirror image, the dividing line between which is indicated at 51 in FIG. 5, and to connect these shells firmly to one another later.

I claim:

1. A device for punching a striplike record medium comprising a pistol-grip-shaped casing, said casing having a record medium guide track along the top surface of said casing, a die wheel rotatably mounted in said casing and on which there are provided pressure surfaces corresponding to punch codes, a set of movable punches disposed between said die wheel and said guide track, said guide track being provided with a set of first openings through which said punches can extend, means for biasing said punches into a recessed rest state, a transport wheel rotatably mounted in said casing adjacent said punches, a further opening being provided in said guide track, said transport wheel having a plurality of engaging means extending through said further opening for engaging said record medium, a lever arm pivotably mounted on said casing, means connecting said lever arm to said die wheel so that when said lever arm is moved from a first position to a second position said die wheel urges certain of said punches through said first openings, and means connecting said lever arm to said transport wheel for rotating said transport wheel a given amount when said lever arm is moved from said second position to said first position.

2. The device of claim 1 further comprising a cover over said guide track, said cover being provided with a set of openings for permitting the entry of the ends of said punches.

3. The device of claim 1 further comprising an indicator wheel external to said casing and coupled to said die wheel.

4. The device of claim 3 further comprising a rotary knob coupled to said die wheel.

5. The device of claim 1 wherein the means connecting said lever arm to said transport wheel comprises ratchet means.

6. The device of claim 5 further comprising a rotary knob external to said casing and connected to said transport wheel.

7. The device of claim 1 wherein said casing comprises two unitary shells which are mirror images, said unitary shells being rigidly connected together.

8. The device of claim 1 further comprising a bearing member for supporting said punches, a screw and slot combination for securing said bearing member to said casing, and set screw means for adjusting the position of said bearing member.

9. The device of claim 1 wherein said biasing means comprising a spring having a comblike configuration wherein pairs of teeth of said configuration engage said punches.

10. The device of claim 2 wherein said cover is hingably connected to said casing.

11. The device of claim 1 wherein said die wheel is interchangeably mounted.

12. The device of claim 3 wherein said indicator wheel is interchangeably mounted.